United States Patent
Riser et al.

[11] Patent Number: 5,892,867
[45] Date of Patent: Apr. 6, 1999

[54] SPHERICAL MULTIPORT ILLUMINATOR OPTIC DESIGN FOR LIGHT GUIDES

[75] Inventors: Andrew P. Riser, Capistrano Beach; Ronald F. Mathis, Ramona; John F. Forkner, Laguna Beach, all of Calif.

[73] Assignee: Remote Source Lighting International, Inc.

[21] Appl. No.: 789,965

[22] Filed: Jan. 31, 1997

Related U.S. Application Data

[63] Continuation-in-part of Ser. No. 374,163, Jan. 17, 1995, Pat. No. 5,559,911, and a continuation-in-part of Ser. No. 459,613, Jun. 2, 1995, Pat. No. 5,706,376, and a continuation-in-part of Ser. No. 599,970, Feb. 14, 1996, and a continuation-in-part of Ser. No. 645,324, May 13, 1996, Pat. No. 5,790,723, and a continuation-in-part of Ser. No. 645,325, May 13, 1996, Pat. No. 5,708,737, and a continuation-in-part of Ser. No. 645,326, May 13, 1996, Pat. No. 5,661,828, and a continuation-in-part of Ser. No. 645,327, May 13, 1996, Pat. No. 5,682,448, and a continuation-in-part of Ser. No. 743,426, Nov. 1, 1996, Pat. No. 5,790,725, and a continuation-in-part of Ser. No. 742,846, Nov. 1, 1996, Pat. No. 5,832,151.

[51] Int. Cl.⁶ ............................... G02B 6/32; F21V 7/04
[52] U.S. Cl. ........................... 385/33; 385/31; 385/35; 385/38; 385/146; 385/147; 385/901; 362/32
[58] Field of Search ................... 385/33, 35, 31, 385/38, 146, 147, 901; 362/32

[56] References Cited

U.S. PATENT DOCUMENTS

| | | | |
|---|---|---|---|
| 4,050,784 | 9/1977 | Kobayashi | 385/34 X |
| 4,302,069 | 11/1981 | Niemi | 385/33 X |
| 4,389,698 | 6/1983 | Cibie | 362/32 |
| 4,704,660 | 11/1987 | Robbins | 362/32 |
| 4,727,380 | 2/1988 | Miura et al. | 346/108 |
| 4,776,666 | 10/1988 | Kuehn et al. | 385/147 X |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,887,190 | 12/1989 | Sadamune et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport et al. | 385/901 X |
| 5,377,287 | 12/1994 | Lee et al. | 385/31 |
| 5,390,265 | 2/1995 | Jiao | 385/15 |
| 5,396,571 | 3/1995 | Saadatmanesh et al. | 385/33 |
| 5,416,669 | 5/1995 | Kato et al. | 362/32 |
| 5,436,805 | 7/1995 | Hsu et al. | 362/32 |
| 5,559,911 | 9/1996 | Forkner et al. | 385/33 |
| 5,661,828 | 8/1997 | Riser et al. | 385/31 |
| 5,682,448 | 10/1997 | Riser et al. | 385/31 |
| 5,706,376 | 1/1998 | Rykowski et al. | 385/31 |
| 5,708,737 | 1/1998 | Riser | 385/31 |
| 5,790,723 | 8/1998 | Riser et al. | 385/31 |
| 5,790,725 | 8/1998 | Rykowski et al. | 385/33 |

FOREIGN PATENT DOCUMENTS

| | | | |
|---|---|---|---|
| 2623231 | 12/1977 | Germany | 362/32 X |
| 2651283 | 5/1978 | Germany | 362/32 X |
| 4309389 | 9/1993 | Germany | 362/32 X |
| 63-291012 | 11/1988 | Japan | 385/33 |
| 6174963 | 6/1994 | Japan | 385/24 |
| 2098311 | 11/1982 | United Kingdom | 385/901 X |
| 9009607 | 8/1990 | WIPO | 362/32 X |

*Primary Examiner*—Brian Healy
*Attorney, Agent, or Firm*—Donald E. Stout; Kenton R. Mullins

[57] ABSTRACT

The inventive system, which is used in transmitting illumination from a central source to a variety of remote locations, efficiently couples the light originating from a lamp, or similar source, into a multiplicity of flexible macroscopic fibers. The combination of the several elements of the inventive system results in a very efficient transfer of the energy of the light source to the fibers. Light from the lamp is fed to a spherical configuration of ports, with each port having one or more flexible macroscopic fibers connected thereto.

20 Claims, 9 Drawing Sheets

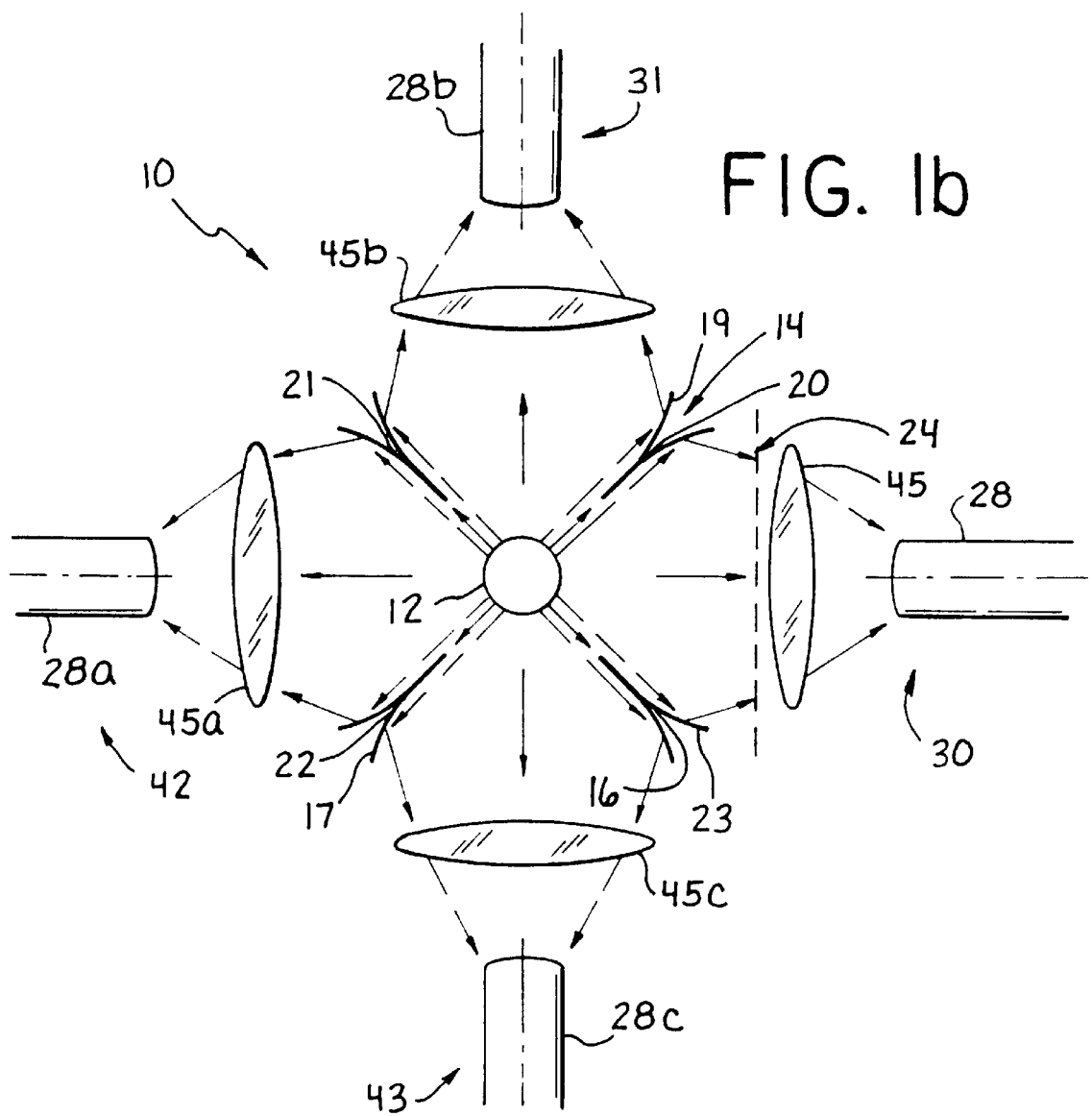

5,892,867

SPHERICAL MULTIPORT ILLUMINATOR OPTIC DESIGN FOR LIGHT GUIDES

This application is a continuation-in-part of U.S. application Ser. No. 08/374,163 filed on Jan. 17, 1995 and entitled OPTICAL FIBER COUPLER USING SEGMENTED LENSES, which issued into U.S. Pat. No. 5,559,911 on Sep. 24, 1996; U.S. application Ser. No. 08/459,613 filed on Jun. 2, 1995, U.S. Pat. No. 5,706,376, and entitled MULTIPORT ILLUMINATOR FOR MACRO-FIBERS; U.S. application Ser. No. 08/599,970 filed on Feb. 14, 1996, pending, and entitled OPTICAL COUPLER; U.S. application Ser. No. 08/645,324, filed on May 13, 1996, U.S. Pat. No. 5,790,723 and entitled MULTIPORT ILLUMINATOR OPTIC DESIGN FOR MACRO-FIBERS; U.S. application Ser. No. 08/645,325, filed on May 13, 1996, U.S. Pat. No. 5,708,737, and entitled MULTIPORT ILLUMINATOR MECHANICAL DESIGN FOR MACRO-FIBERS; U.S. application Ser. No. 08/645,326, filed on May 13, 1996, now U.S. Pat. No. 5,661,828, and entitled REFLECTOR FOR ILLUMINATION SYSTEM; U.S. application Ser. No. 08/645,327, filed on May 13, 1996, U.S. Pat. No. 5,682,448 and entitled REFLECTOR AND ILLUMINATION SYSTEM; U.S. application Ser. No. 08/743,426, filed on Nov. 1, 1996, U.S. Pat. No. 5,790,725 and entitled MULTIPORT ILLUMINATOR FOR MACRO-FIBERS; and U.S. application Ser. No. 08/742,846, filed on Nov. 1, 1996, now U.S. Pat. No. 5,832,151, and entitled REFLECTOR AND ILLUMINATION SYSTEM, all eight of which are commonly assigned and the contents of which are expressly incorporated herein by reference.

BACKGROUND OF THE INVENTION

1. Field of the Invention

The present invention relates generally to reflectors and, more particularly, to reflectors for coupling light from a light source into one or more light guides.

2. Description of Related Art

Large diameter fiber optics, often referred to as "flexible light guides", are well known in the art, and typically comprise a single, solid core light guide which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter light guides, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), and jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source, as is discussed in related application Ser. No. 08/374,163 now U.S. Pat. No. 5,559,911. Early prior art systems attempted to bundle the light guides as closely as possible in order to maximize efficiency and to ensure the maximum ratio of core area (the part of each light guide which actually transmits light) to total area. The light guides are round and thus have a great deal of space between them due in part to the cladding and shielding layers. All of the light not falling upon the cores is wasted, and becomes an efficiency loss, since it will not be transmitted by the light guides. Additionally, packing the light guides closely together creates problems such as mechanical difficulties in configuring and accommodating the illumination system and difficulties encountered in attempting to replace one of the individual bundled light guides. This design also typically results in color variation between light guides unless techniques are specifically employed to prevent this problem.

One prior art solution to this problem has been to eliminate the sheathing and cladding layers about each light guide, in order to reduce the area across the bundled array of light guides which does not transmit light. However, there is still a packing factor problem because the light guides are round, and there are other physical disadvantages in eliminating those layers. Thus, this solution is unsatisfactory for most applications.

A number of prior art approaches use reflectors for focussing light from a source of illumination into one or more light guides. U.S. Pat. No. 5,222,793 and U.S. Pat. No. 5,259,056, both to Davenport et al., disclose lighting systems which use a single reflector assembly for illuminating light transmissive elements. U.S. Pat. No. 5,396,571 to Saadatmanesh et al. discloses a multi-segmented lens which divides light from a light beam into four separate beams, each of which is focussed onto a separate optical fiber. U.S. Pat. No. 4,912,605 to Whitehead discloses an electric light source mounted between two reflectors, each of which directs light into a corresponding light guide. U.S. Pat. No. 5,469,337 to Cassarly et al. discloses a light source and a plurality of curved reflectors for focussing light into lenses and then into a plurality of light guides. The use of reflectors and multi-segmented lenses by the prior art for coupling light into light guides has represented some advancement over the prior art bundled light guides, but the need for a proper and efficient coupling of a light source to a plurality of light guides still remains.

In many cases the proper and efficient coupling of a light source to a plurality of light guides changes according to the particular light source being used. Modern electrodeless lamps, for example, which are electrodeless and burn very brightly, can be too powerful for coupling to only one or two light guides. If an inefficient coupling is used the effective luminosity may be reduced for a better match with the light guides, but the cost of running the system will then be unreasonably high as a result of the wasted energy. Efficiency is still desired so that the energy associated with generating the high luminosity of such a bright illumination source can be fully utilized.

Another problem associated with prior art designs is the large number of optical components associated with these designs. Reducing the number of parts of any optical design would appear to be advantageous to any system.

SUMMARY OF THE INVENTION

This invention efficiently couples the light originating from a light source, such as an electrodeless lamp or, more particularly, a 1000 watt fusion lamp, into a multiplicity of flexible macroscopic light guides. Such a system is to be used in transmitting illumination from a central source to a variety of remote locations. The combination of the several elements of the inventive system results in a very efficient transfer of the energy of the light source to the light guides.

According to one aspect of the present invention, a light guide illumination system includes a light source, a multi-sectored lens, and at least one output light guide for receiving the light.

A light guide illumination system, according to the present invention, includes an illumination source for emitting light, and a configuration of focussing lenses disposed substantially around the illumination source. Each of the focussing lenses is adapted for focussing emitted light from the illumination source in a generally radially outwardly direction from the illumination source. The configuration of focussing lenses forms a trunkated spherical structure, which is disposed around the illumination source.

The illumination source may comprise a sulfur bulb. Each of the focussing lenses is adapted for focusing an approximately equal amount of emitted light from the illumination source in a generally radially outwardly direction from the illumination source. The light guide illumination system may further comprise a plurality of mixing rods. Each of the mixing rods is adapted for receiving light from a corresponding one of the focussing lenses. Alternatively, the focussing lenses may comprise transfer lenses, and the light guide illumination system may comprise a plurality of condenser lenses which are adapted for receiving light from the transfer lenses.

According to another aspect of the present invention, a spherical optical illumination system includes an illumination source having a proximal portion, a distal portion, and an intermediate portion between the proximal portion and the distal portion. The spherical optical illumination system further includes a curved reflector disposed near the proximal portion of the illumination source, and a semi-sphere of focussing lenses disposed generally around the distal portion and the intermediate portion of the illumination source. Each of the focussing lenses is adapted for focusing emitted light from the illumination source in a generally radially outwardly direction from the illumination source. The curved reflector and the semi-sphere of focussing lenses together substantially surround the illumination source. The curved reflector is adapted for redirecting proximally directed light into the semi-sphere of focussing lenses. The illumination source may comprise a 1000 watt bulb, and the curved reflector may have a generally circular perimeter. The spherical optical illumination system further includes a wire cage, which surrounds the distal portion and the intermediate portion of the illumination source.

According to yet another aspect of the present invention, an assembly of lenses includes a plurality of radially curved lens groups. Each of the radially curved lens groups includes a plurality of focussing lenses formed therein. The plurality of lens groups is adapted for fitting substantially around an illumination source. The plurality of lens groups is adapted for contacting and fitting next to one another around the illumination source.

The assembly of lenses includes a plurality of side lens groups adapted for being disposed around an illumination source, and a top lens group adapted for being disposed above the illumination source. The plurality of side lens groups may comprise five side lens groups. Each of the five side lens groups comprises twelve focussing lenses, and the top lens group may comprise eight focussing lenses. Each of the twelve focussing lenses of each of the five side lens groups comprises five edges. Each of seven of the eight focussing lenses of the top lens group comprises four edges, and an eighth of the eight focussing lenses of the top lens group comprises seven edges.

The present invention, together with additional features and advantages thereof, may best be understood by reference to the following description taken in connection with the accompanying illustrative drawings.

BRIEF DESCRIPTION OF THE DRAWINGS

FIGS. 1a and 1b are schematic top views of optical systems, according to the present invention;

FIG. 2 is an enlarged schematic view of the lamp and right portion of the quad reflector illustrated in FIG. 1a;

FIG. 3 is a schematic side view illustrating the multi-sector lens which forms a part of the optical system shown in FIG. 1a;

DETAILED DESCRIPTION OF THE PREFERRED EMBODIMENT

Referring now more particularly to the drawings, an optical system 10 is illustrated including a compact light source 12, which may comprise an arc lamp or similar source. The light source 12 is placed at the focus of a quad-curved reflector 14, which comprises four reflector portions 16, 17, 18, and 19 disposed in back-to-back fashion. In each of the reflector portions 16–19, the center or vertex region of the reflector has been removed, as illustrated. The four reflector portions 16–19 can be seen in the figure joined at intersection points 20–23.

Light is emitted from the light source 12, which preferably comprises an electrodeless lamp, such as a Solar 1000® sulfur lamp, manufactured by Fusion Lighting of Baltimore, Md. The light source 12, however, can comprise any conventional means for emitting light. This 1000 watt light source 12 is reflected by the quad reflector 14, as illustrated by the lines of incidence shown in FIG. 1a, in four different directions, and is then directed through an angle of approximately 90 degrees (or any other desired angle) by each of four flat reflectors or fold mirrors.

Figure 1A:
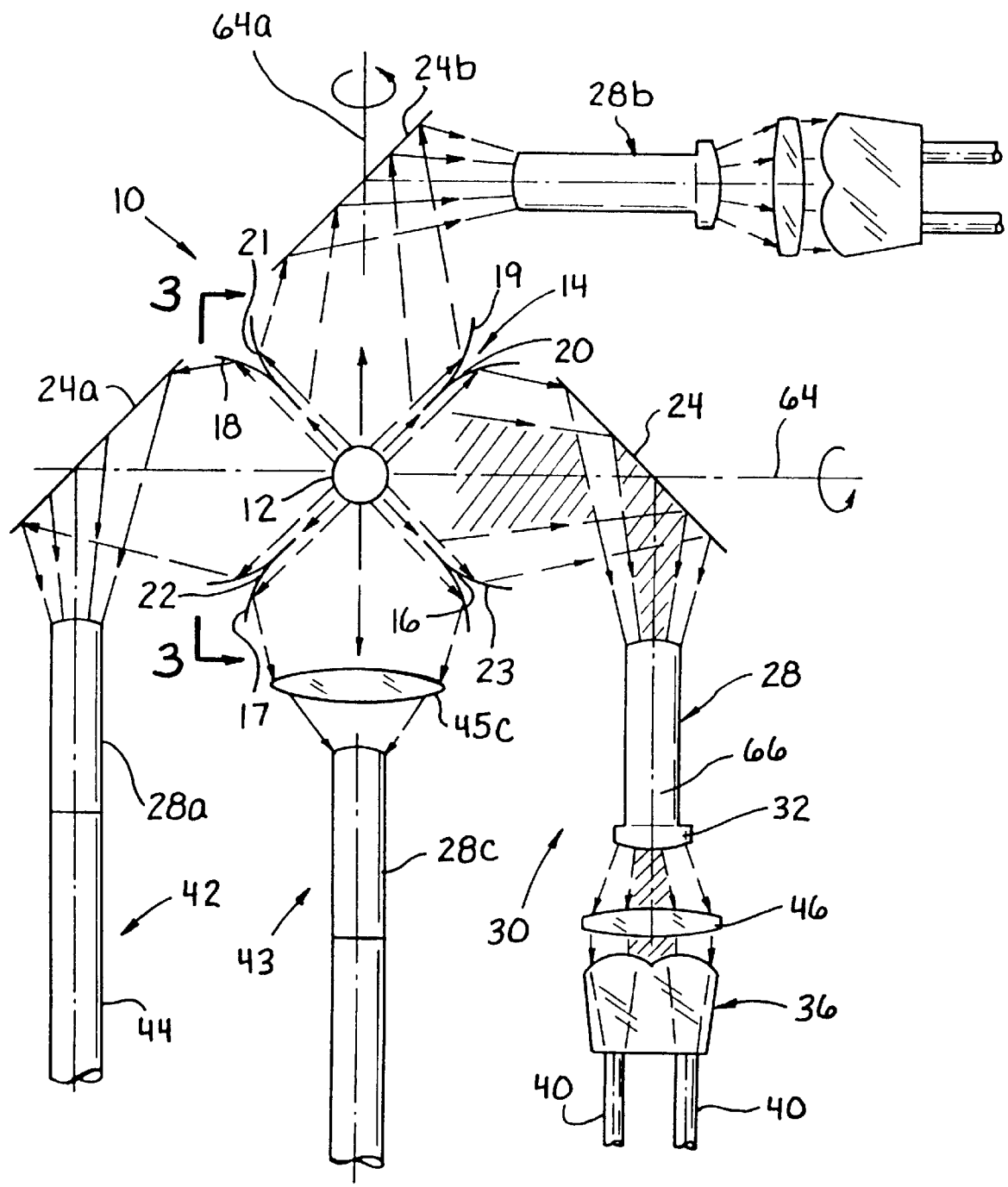

FIG. 1a illustrates three fold mirrors 24, 24a, and 24b corresponding to the three reflectors 16, 18, and 19, respectively. Only three fold mirrors 24, 24a, and 24b are illustrated in FIG. 1a, but up to four fold mirrors may be implemented, one corresponding to each of the reflector portions 16–19. The fold mirrors serve a primary purpose of reflecting heat generated by the light source 12, and are thus advantageous when a hot light source 12 is used. Each of the fold mirrors in FIG. 1a thus serves a purpose of reflecting heat from the light source 12 away from the light source 12. Since the Solar 1000® sulfur lamp of the presently preferred embodiment does not burn hot, the presently preferred embodiment, as shown in FIG. 1b, does not incorporate fold mirrors.

Ultra-violet (UV) and/or infrared (IR) radiation blocking coatings may be placed on the exit lens faces 32, and are preferred in linear embodiments when the fold mirrors 24 are not used. As an alternative to the lens face 32 coatings, hot mirrors 24' (FIG. 1b) may be used for reflecting UV and IR radiation. These hot mirrors 24' may be placed at any stage between the light source and the output light guides and, further, may be placed at perpendicular or off-axis orientations. Each focussed beam of light impinges on a lens end of a respective one of the circular mixing rods 28, 28a, 28b, and 28c. Each of the four circular mixing rods 28, 28a, 28b, and 28c comprises a transparent material, such as glass or clear plastic, and is adapted to integrate the light beam by means of multiple reflections within the mixing rod. The mixing rods may be omitted in an alternative embodiment of the present invention.

Figure 3:
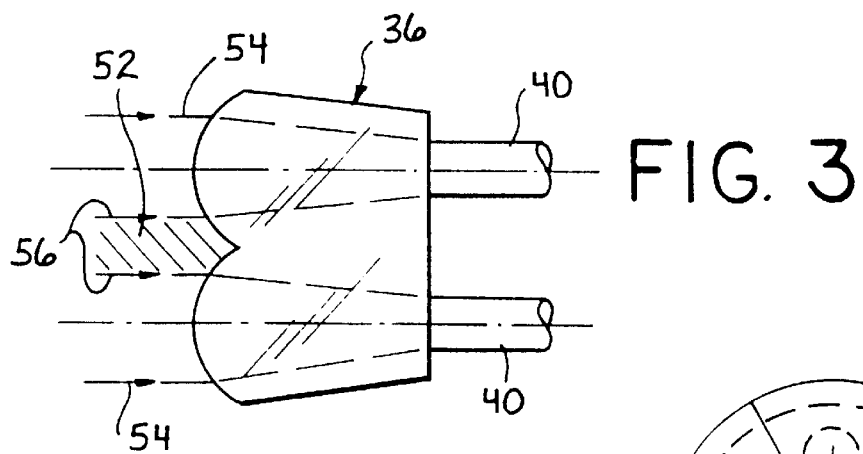
Figure 4:
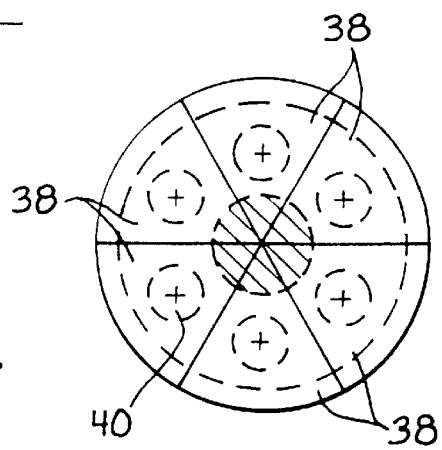
FIG. 4 is an end view of the multi-sector lens shown in FIG. 3.

On the right side of the system, or right channel 30, as illustrated in FIG. 1a, the light beam emerges from the mixing rod 28 at the exit lens face 32. The diverging beam from the mixing rod 28 is then focussed and split into a number of separate focussed beams by means of a multi-sectored lens 36 (FIGS. 1, 3 and 4). Each of the lens sectors 38 (FIG. 4) focusses light onto the core of a corresponding output light guide 40.

In a conventional optical design, a focussing lens would likely be required between the circular mixing rod 28 and the multi-sectored lens 36. The multi-sectored lens 36 of the present invention, however, is modified over conventional lenses to obviate any need for a focussing lens. For example, the multi-sectored lens 36 is larger than would be required with a conventional focussing lens between the multi-sectored lens 36 and the circular mixing rod 28. Alternatively, a conventional focussing lens may be used with the multi-sectioned lens 36.

The optical system for the top beam of FIG. 1a focussed by the quad reflector 14 through the top channel 31 is essentially the same as that of the right channel 30. The optical system for the left beam focussed by the quad reflector 14 through the left channel 42 can be essentially the same as that described with respect to the right channel 30 or, alternatively, different features may be incorporated into the left channel 42. For example, the right channel 30 or the top channel 31 may have a sector lens accommodating ten output light guides, while the left channel 42 may only couple to a single large light guide or multi-light guide bundle 44. Different features, including combinations of the features illustrated within the right channel 30, the top channel 31, and the left channel 42, may be incorporated and used with any of these channels, in various combinations. Additionally, combinations of these features may be used with the bottom channel 43. The bottom channel 43 is shown with a focussing lens 45c and without a fold mirror. As in the presently preferred embodiment of FIG. 1b, the focussing lens 45c of FIG. 1a focusses light from the second reflector portion 17 to the circular mixing rod 28c. The focussing lens 45c may be used instead of, or in addition to, any of the fold mirrors 24, 24a, and 24b in the right, left, and top channels 30, 42, and 31, respectively, according to design parameters.

According to the presently preferred embodiment of FIG. 1b, which implements a Solar $_{1000}$® electrodeless lamp, the fold mirrors are not used in the FIG. 1a configuration and light from the four reflector portions 16–19 is focussed directly into mixing rods and, subsequently, focussed into either lenses or segmented lenses.

As illustrated in FIG. 1a, a rotating color wheel 46 is disposed at the exit of the mixing rod 28 or, alternatively, in front of the sector lens 36. With the color wheel 46 at the light guide exit, the color of the light to all of the light guides is the same and changes simultaneously as the wheel rotates. With the wheel near the entrance to the sector lens 36, the colors to each light guide are different and can change at different rates depending on the pattern of the wheel. These various color controls are useful in pool lighting, signs, and other applications.

The high efficiency of this illumination system derives from the special design of a number of its elements working alone and in combination. When the electrodeless lamp is not used, the light source 12 is preferably selected to have small arc dimensions so that it will couple into light guides of relatively small diameter (preferably 3 mm to 10 mm). The quad-curved reflector 14 consists of four axially symmetrical curved halves or portions 16–19, with the light source 12 centered at their matching plane. This arrangement makes use of the very efficient collection properties of the low magnification section of the ellipsoidal (or near ellipsoidal) reflector shape. A large hole 48 in the center of each of the four reflector portions 16–19 results in a focussed light beam with a ring-shaped cross section. Light entering the hole in each reflector portion is not lost but passes into the opposite reflector portion and is focussed into the second focussed beam. This reflector arrangement efficiently generates a ring cross-section beam which is very useful in reducing the radial aperture required of each of the sector lenses 38 (FIG. 4).

Figure 2:
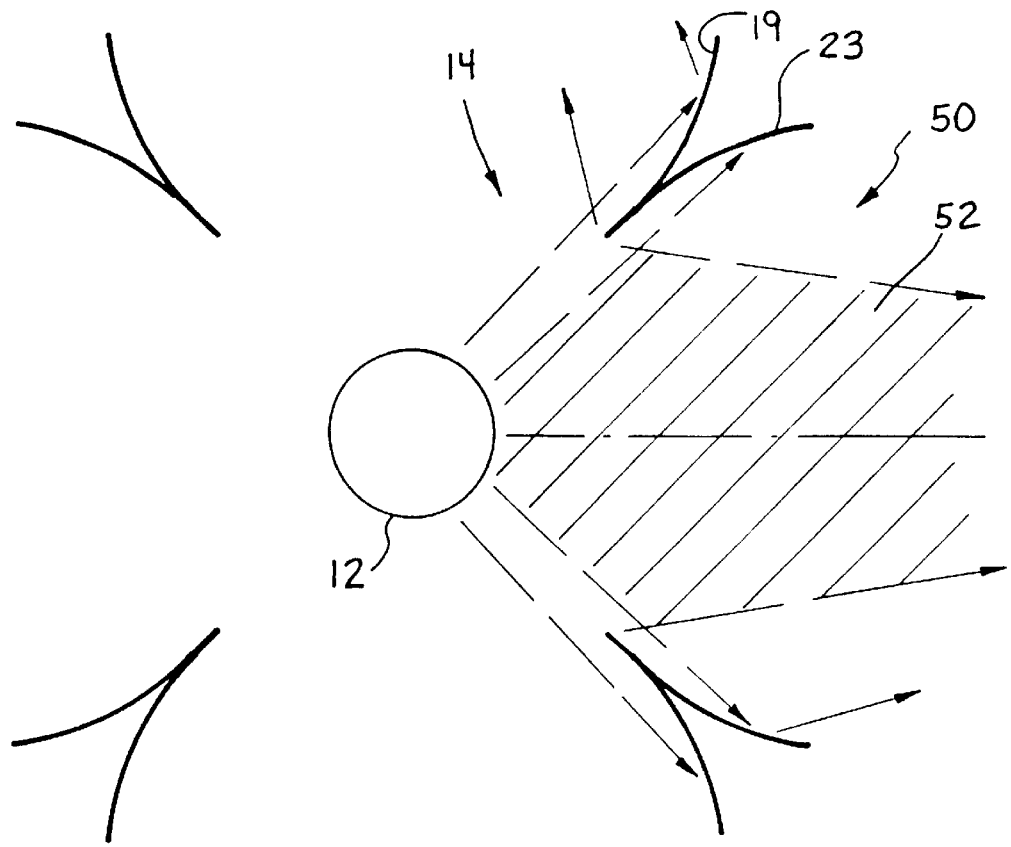

FIG. 2 shows a section through the right portion of the quad-reflector 14 indicating how the ring-shaped beam 50 is generated. The ring-shaped beam 50, wherein the darkened center portion 52 is represented by cross-hatching, is preserved through the mixing rod 28.

As best shown in FIG. 3, the ring-shaped beam impinges on the sector lens 36 as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter light guides, thus unexpectedly increasing the efficiency of the system. The minimum light guide diameter is controlled by the need to match the output beam divergence to the numerical aperture of the light guide.

Another feature of the present invention is the orientation of the light source 12. As illustrated particularly in FIG. 2, the light source 12 is shown at the focal point of the dual reflector 14. The long dimension of the arc discharge of the light source 12 is oriented so as to be substantially parallel and coincident with a reflector symmetry axis, which passes through the light source 12 and which is perpendicular to the page on which FIG. 2 is printed. Small output light guide diameter is usually desired in most applications. A design for a small light guide will also in general provide efficient coupling to larger light guides provided the numerical aperture of the larger fiber is the same or larger than the smaller fiber. In the presently preferred embodiment, the output light guide core diameter is nominally one half inch. This large diameter is required because the high output power of the light source may burn smaller light guides. Additionally, the sector lens of the present invention, which obviates any need for a focussing lens, has an aspheric shape that can be specified using standard optical equations.

Although six equal lens sectors 38 are illustrated in FIG. 4, the sector lens 36 can have as few as two and up to about twelve or more sectors. Also, the sectors need not be equal in area, since in some applications it may be desirable to deliver different amounts of light to different locations. The sector lens as a means of splitting the incident beam has a major advantage over currently used bundled light guides in that the sector lens array separates the light guides from each other (FIGS. 3 and 4), thereby permitting easy installation and removal of individual light guides.

As previously mentioned, the fold reflectors 24, 24a, and 24b may serve a multiple function of both folding mirror and heat rejecting mirror. As a fold mirror, they may be used with or without a hot light source 12, and provide the ability of rotating the entire output optical system around mechanical axes 64 and 64a, as best shown in FIG. 1a. This feature is very useful in allowing great flexibility in positioning the direction in which the light guides emerge from the unit. Independent rotation of the fold mirrors 24 and 24a, for example, on either side of the lamp gives additional flexibility of output light guide location.

As described above, the circular mixing rod 28 (as well as mixing rods 28a, 28b, and 28c) is used to integrate the angular distribution of the light around the rod axis 66. This is advantageous since it allows the light output of each light guide to be identical (which is usually desired), because the angular light distribution from the lamp is not generally uniform. Additionally, a metal-halide type of arc lamp, which may be used, typically has some color differences in the angular distribution which also need to be integrated out in order to avoid undesirable color differences in output between light guides. A field lens 32, for example, is preferably employed on each of the mixing rod ends to constrain the light inside the rod so that it is totally reflected internally. Mechanically, the field lens portion 32 of the mixing rod 28 is larger in diameter than the rod section itself in order to provide a loss-free means of mounting the mixing rod 28. Anything touching the mixing rod surface will bleed off some of the internally reflected light unless the rod is clad, which is a disadvantageous approach since it reduces its numerical aperture and increases its cost. Each mixing rod may be coated with a low-index material, according to one embodiment of the present invention.

The individual lens sectors 38 (FIG. 4) comprise a relay lens system that roughly images the output end of the mixing rod onto the light guide port. The lens sectors may have aspheric shapes to reduce aberrations and improve efficiency, and are preferably given a thickness such that the output beam is focussed on the flat rear surface of the lens sector. This allows the soft core of the usual type of light guide to "wet" the lens surface, thereby reducing reflection losses at this interface. In another embodiment of the present invention, the light guides 40 and the lens sector 38 surfaces may be spaced, such that a so-called "air gap" is disposed therebetween.

The quad-curved reflector 14 illustrated in FIG. 1a may be expanded or reduced to add more or less curved reflectors. For example, three curved reflectors or eight curved reflectors may be embodied, instead of four curved reflectors. The number of curved reflectors (ports) will be dependent upon the particular system requirements. Each curved reflector, corresponding to a port, is independent of the other ports and, accordingly, can be coupled to one or several light guides, mixing rods, or light guides. The largest number of curved reflectors, or ports, will often be determined by the size limitations of the focussing optics, such as the focussing lenses, for example.

Reflectors, such as the quad-curved reflector 14, used to collect light from a light source 12 and launch the light into light guides, are inefficient because such a configuration apparently violates principles described by the étendue variant. The étendue or Lagrange invariant is a quantity of a beam of light that is an invariant through an optical system. The étendue can be defined in several different ways which must be discerned by the context. The simplest definition is based on rays of light from a far distant object subtending an angle of $2\theta$ at a circular aperture of radius a. According to the paraxial approximation, the étendue is denoted by $\theta a$. If the circular aperture is the input to an optical system, and if there are no obstructions to the beam in the system and absorption and scattering etc. are ignored, then the étendue quantity is invariant through the system.

The square of this quantity $\theta a$ is $\theta^2 a^2$. This squared quantity is also invariant through the system and is often referred to as the three dimensional étendue. This three dimensional form of the étendue is useful because it is proportional to the power flow through the system.

In non-imaging applications (including fiber optic and light guide illuminators) the paraxial approximation is not valid and the more general definition of étendue must be used. This more general definition is stated in terms of small displacements of a ray of light propagating from a point $P(x,y,z)$ in an input medium of index n to a point $P'(x',y',z')$ in an output medium of index n'. The direction cosine at point P is indicated as (L,M,N) and the direction cosine at point P' is indicated as (L',M',M'). Small displacements of the ray of light at point P are indicated by dx and dy with corresponding changes dx' and dy' at point P' and, similarly, small changes in the direction cosines are indicated by dL, dM, dL', and dM'. With these definitions the étendue invariant relationship is given by:

$$n'^2 \, dx' \, dy' \, dL' \, dM' = n^2 \, dx \, dy \, dL \, dM$$

where L and M correspond to the direction cosines for the x and y axes, respectively.

Applying this result to the first definition of étendue given above, it can be determined that the étendue is proportional to $a^2 \sin^2\theta = a^2 NA^2$ where NA is the numerical aperture. In this result constant factors are dropped and the refractive index is assumed to be identical at both points. The general definition allows one to compute the étendue for arbitrary situations if the integrals can be evaluated.

The use of reflectors to collect light from a noncoherent source and launch it into light guides is inefficient, since this use apparently violates the fundamental principles described by the étendue invariant. A reflector is typically in close proximity to a light source, with the light source generally being positioned at a focal point, and the reflector subtends a large solid angle resulting in a large value for the étendue invariant.

In contrast, a light guide has a relatively small opening (core diameter), with a limited numerical aperture, resulting in a relatively small value for the étendue invariant. A spherical array or spherical shell of lenses is ideal for collecting light from a noncoherent light source, since substantially all of the light, ignoring absorption, scattering etc., can be collected and directed to an array of light guides. Furthermore, the use of a spherical array or spherical shell of lenses is consistent with the principles of étendue. The constraints in a particular application include the size and shape of the illumination source, and the size and numerical aperture of the light guides. The variables include the number of lenses, which determines the number of light guides, and the lens powers. The design is constrained first by the image size, which is determined by the size of the light guide core. Therefore, the light guide size fixes the magnification. With a given magnification, the maximum lens size is constrained by the light guide numerical aperture. This in turn determines the minimum number of lenses (and light guides) that can be used. A larger number of smaller lenses can always be used, because the angular extent of the light will then be less than the light guide numerical aperture.

Figure 5:
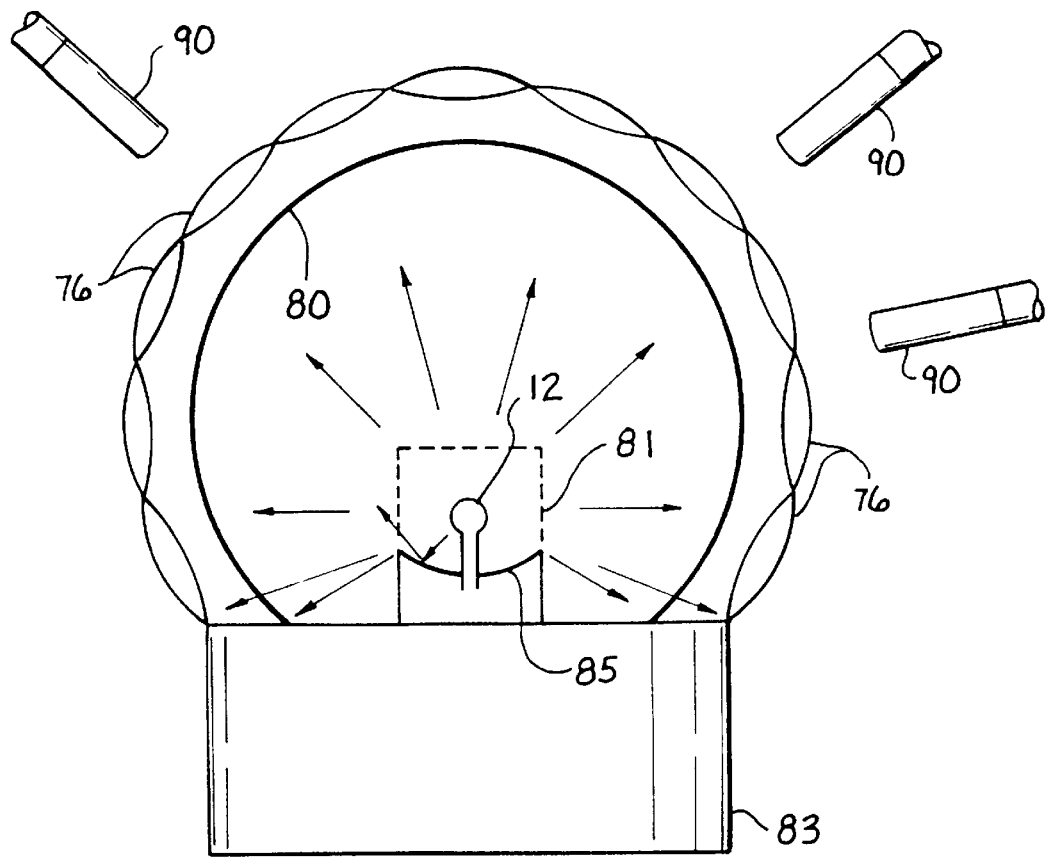
FIG. 5 is a schematic view of the spherical multiport optical illuminator, according to the present invention.
Figure 6:
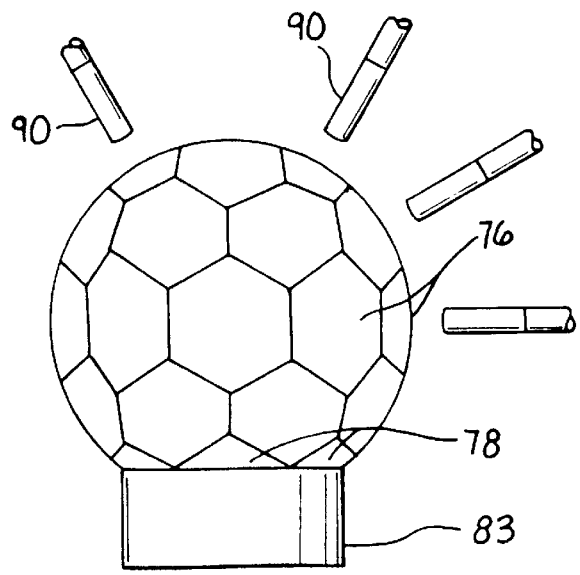
FIG. 6 is a side-elevational view of the spherical multiport optical illuminator shown in FIG. 5.

FIGS. 5 and 6 illustrate a general configuration where a light source 12 is substantially surrounded by a sphere of lenses. The light source 12 is surrounded by a wire cage 81, which forms a microwave cavity. A motor (not shown) disposed within the microwave source 83 rotates the light source 12 about a vertical axis, to thereby facilitate a uniform plasma. The motor, the wire cage 81, the microwave source 83, and a flat reflector (not shown), disposed between the wire cage 81 and microwave source 83, can be obtained from Fusion Lighting of Baltimore, Md., as previously mentioned in connection with the Solar 1000® sulfur lamp. According to the present invention, a curved semi-spherical retro-reflector 85 is used in place of the flat reflector, which is provided by Fusion Lighting. The curved retro-reflector 85 redirects light from the light source 12 generally back through the lamp toward the focussing lenses 76.

A mixing rod 90 is coupled to each focussing lens 76. The number of mixing rods 90 may be increased or decreased to increase or decrease the total number of ports of the system, depending upon preference. Mixing rods may also be eliminated altogether or replaced in whole or in part with other light guides. Of course, the maximum number of mixing rods 90 is limited by the number of focussing lenses 76 in the spherical assembly. As with all of the embodiments of the present invention, sector lenses 36 and output light guides 40 (FIG. 1a), as well as other optical elements and combinations thereof, may be used with or in place of the mixing rods 90. Reflectors, corresponding to the fold mirrors 24, 24a, and 24b, may be implemented in these embodiments as well. The curvature of the curved reflector 85 is generally spherical to focus the lamp on itself, but may alternatively be computer generated and empirically tested to maximize reflections from the light source 12.

Figure 7:
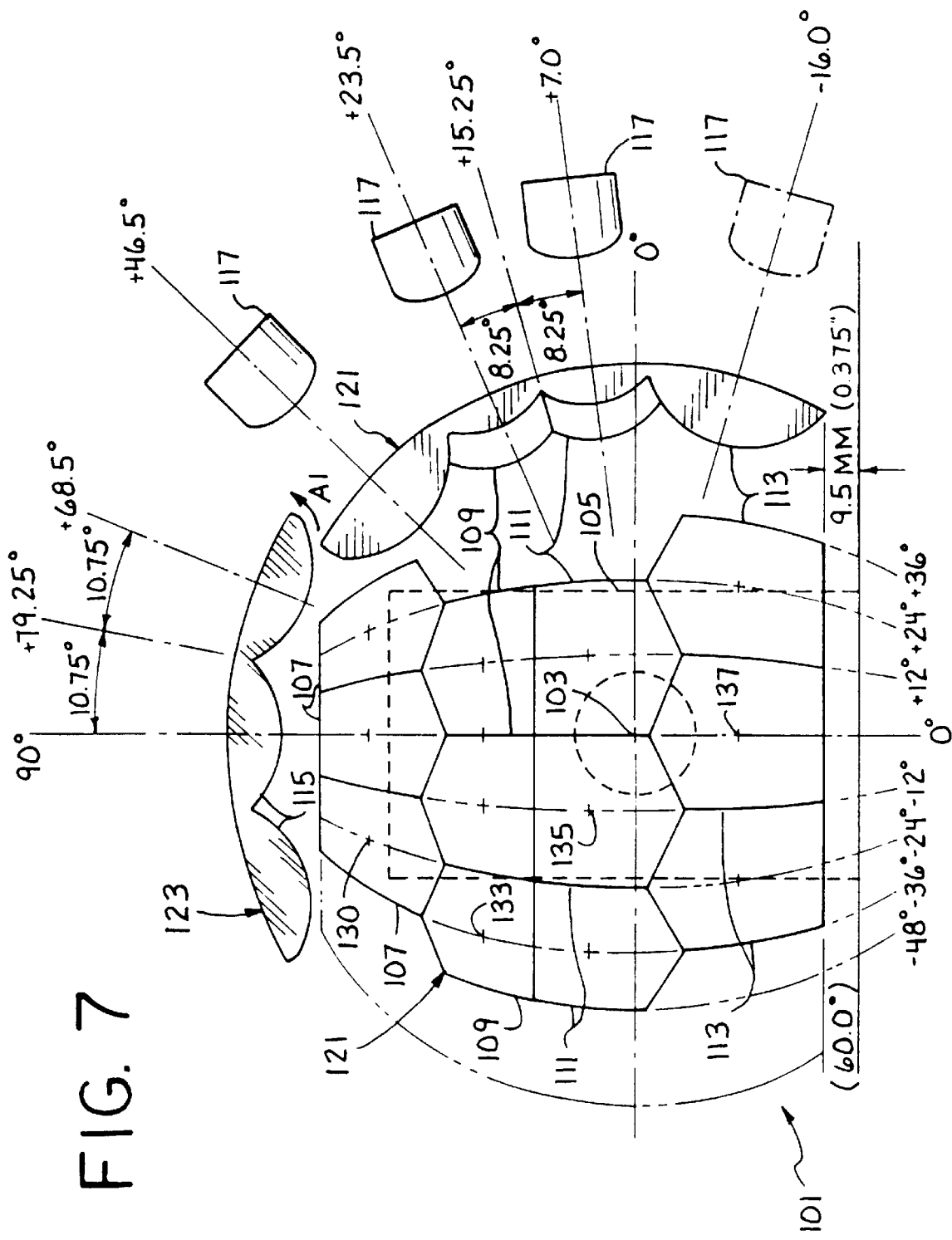
FIG. 7 is a schematic view of the spherical multiport optical illuminator, according to the presently preferred embodiment.

Turning to FIG. 7, the presently preferred embodiment of the spherical multiport optical illuminator 101 is schematically illustrated. The spherical multiport optical illuminator 101 comprises a plurality of transfer lenses disposed around a light source 103. The light source 103 is similar to the light source 12 of FIGS. 5 and 6, and the transfer lenses are similar to the focussing lenses 76 of FIGS. 5 and 6. A wire cage 105 surrounds the light source 103. As presently embodied, four rows of transfer lenses encircle the light source 103, and a top layer of transfer lenses is positioned above the light source 103. The first transfer lenses 107 form a first row, the second transfer lenses 109 form a second row, the third transfer lenses 111 form a third row, and the fourth transfer lenses 113 form a fourth row. Top transfer lenses 115 form the top layer of lenses, and condenser lenses 117 are positioned to receive light from the transfer lenses. A condenser lens 117 can be coupled to each transfer lens. The number of condenser lenses 117 may be increased or decreased to increase or decrease the total number of ports of the system, depending upon preference. The maximum number of condenser lenses 117 is limited by the number of transfer lenses.

The first transfer lenses 107, second transfer lenses 109, third transfer lenses 111, and fourth transfer lenses 113 are preferably molded together in lens groups. The side lens group 121 preferably comprises three first transfer lenses 107, three second transfer lenses 109, three third transfer lenses 111, and three fourth transfer lenses 113. A top lens group 123 preferably comprises eight top transfer lenses 115. Each side lens group 121 and the top lens group 123 is preferably molded of glass BK-7. As presently embodied, all five of the side lens groups 121 are substantially identical in shape, and each side lens group 121 can be secured between two other side lens groups 121.

Figure 8:
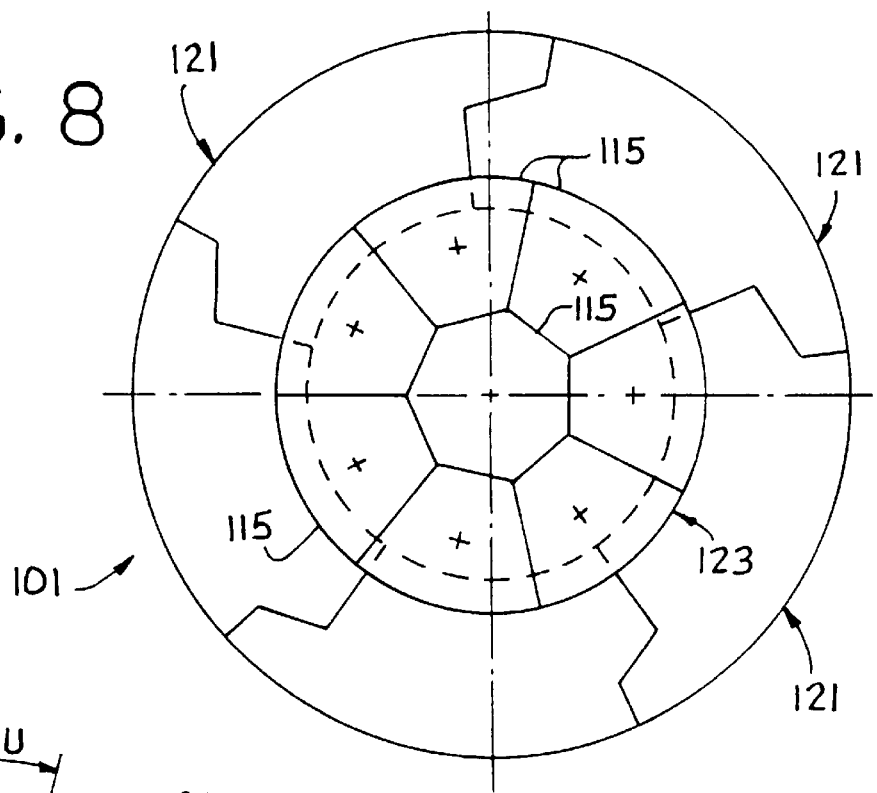
FIG. 8 is a top view of the spherical multiport optical illuminator, according to the presently preferred embodiment.

As can be seen in FIG. 8, the top lens group 123 may slightly overlap the first transfer lenses 107 of each side lens group 121. The arrow A1 in FIG. 7 illustrates a possible air flow path, which facilitates the escape of heat generated by the light source 103. In an alternative presently preferred embodiment, the top lens group 123 may be sealed onto the first transfer lenses 107, and air may be circulated within the closed structure. The light source 103 is preferably placed at a focal point of all of the transfer lenses 107, 109, 111, 113, 115, and condenser lenses 117.

Figure 9:
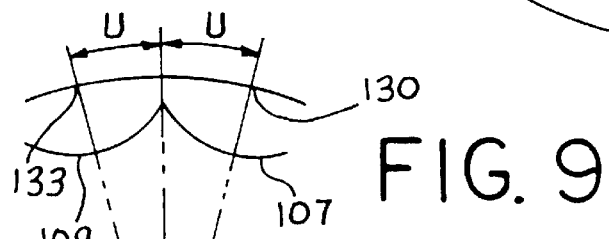
FIG. 9 is a diagram view illustrating the position of the edges of two lens groups, relative to an illumination source, according to the presently preferred embodiment.

As shown in FIG. 9, the focal point 130 of a first transfer lens 107 and a focal point 133 of a second transfer lens 109 are both evenly positioned relative to the light source 103 when the lenses are properly secured. Similarly, a focal point 135 of a third transfer lens 111 and a focal point 137 of a fourth transfer lens 113 are evenly positioned about the light source 103 when the third transfer lens 111 and the fourth transfer lens 113 are properly positioned.

Figure 10:
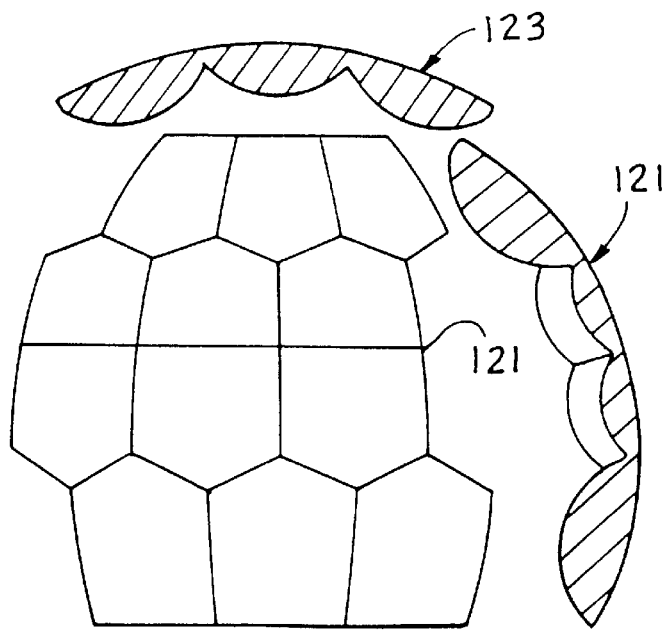
FIG. 10 is a side-elevational view illustrating three lens groups, according to the presently preferred embodiment.
Figure 11A:
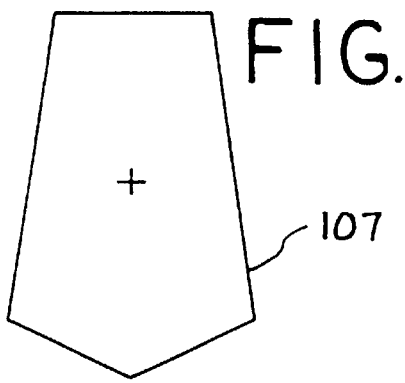
FIGS. 11a–11d are top planar views of various transfer lenses, according to the presently preferred embodiment.
Figure 11B:
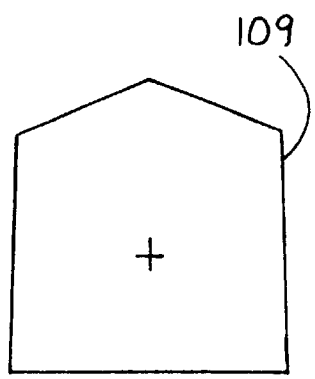
Figure 11C:
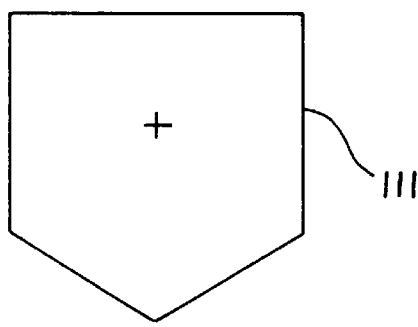
Figure 11D:
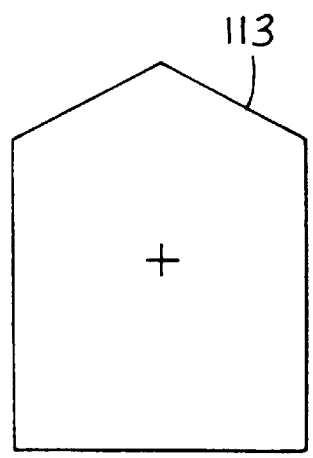

FIG. 10 illustrates a cross-sectional view of a side lens group 121 and a side-elevational view of another side lens group 121. FIG. 10 also illustrates a cross-sectional view of the top lens group 123. FIG. 11a illustrates a side-elevational view of a first transfer lens 107, and FIG. 11b illustrates a side-elevational view of a second transfer lens 109. FIG. 11c illustrates a side-elevational view of a third transfer lens 111, and FIG. 11d illustrates a side-elevational view of a fourth transfer lens 113. The outer surfaces of the transfer lenses 107, 109, 111, 113, and 115 are preferably ground or polished to a constant radius from the light source 103, when the lenses 107, 109, 111, 113, and 115 are positioned about the light source 103. The inner surfaces of the lenses 107, 109, 111, 113, and 115, however, are preferably aspherically shaped.

Figure 11E:
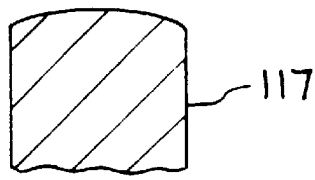
FIG. 11e is a cross-sectional view of a condenser lens, according to the presently preferred embodiment.
Figure 12:
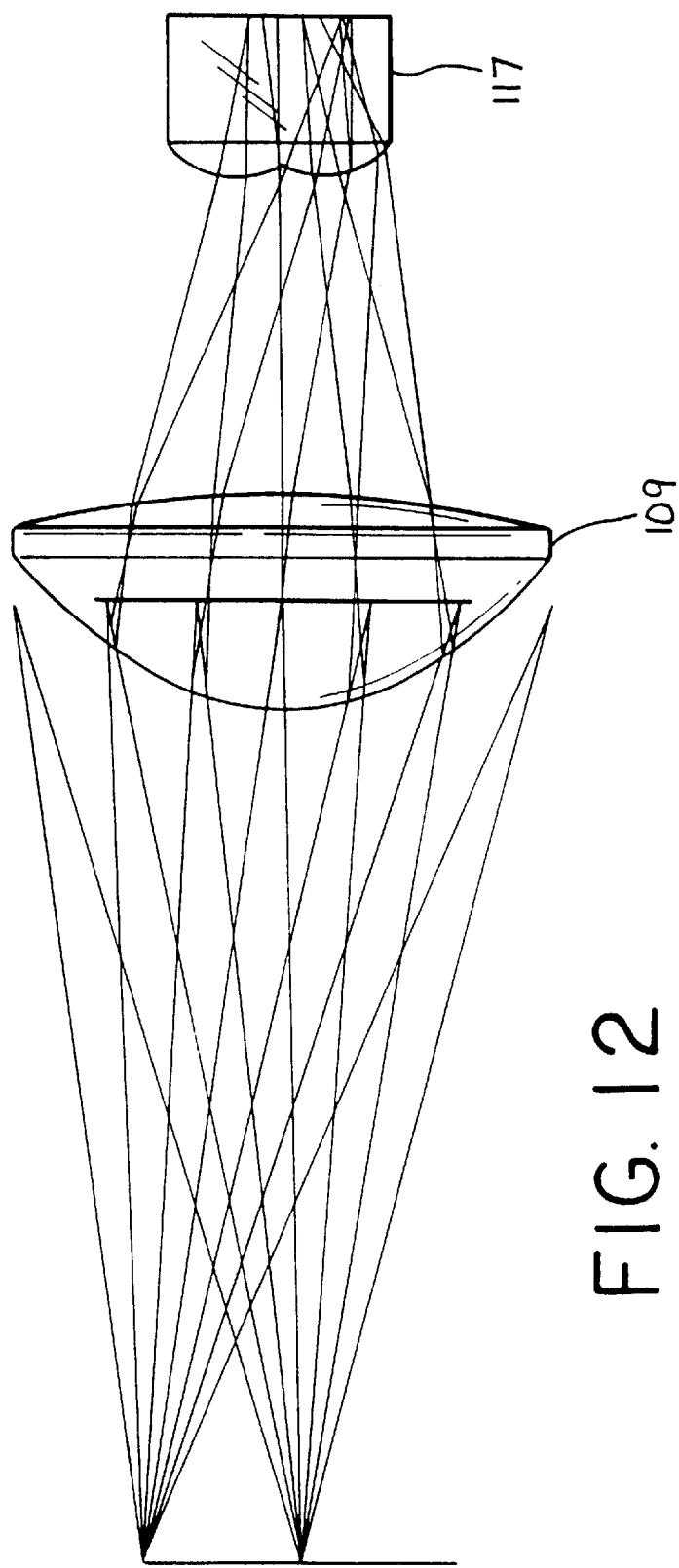
FIG. 12 is a schematic view of a transfer lens and a condenser lens, according to the presently preferred embodiment.

FIG. 11e illustrates a cross-sectional view of a condenser lens 117. Each of the transfer lenses 107, 109, 111, 113, and 115 are adapted for transferring light from the light source 103 onto a corresponding condenser lens 117. The condenser lenses 117, in turn, focus light onto corresponding light guides (not shown). When an electrodeless lamp is used, the light guides preferably comprise fibers which are rated for the proper lumen output. For high-lumen output cases, the fibers will often comprise a non-plastic material. As shown in FIG. 12, light impinging onto a second transfer lens 109, for example, is focussed onto the condenser lens 117'. Light passing through the condenser lens 117' is condensed for imaging onto a light guide.

Figure 13:
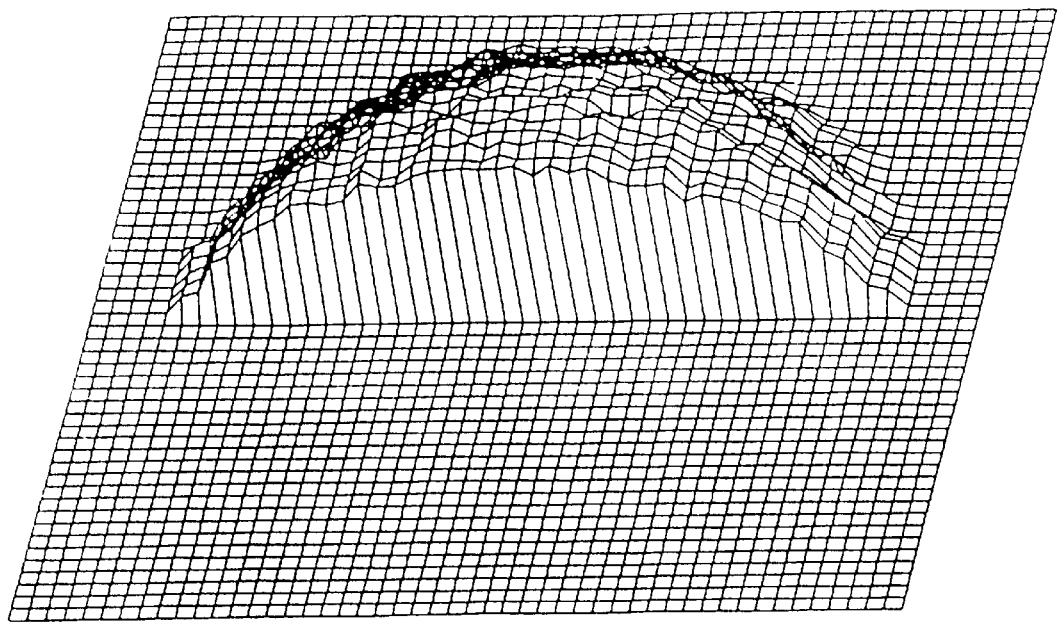
FIG. 13 illustrates a three dimensional plot of light intensity focussed by the condenser lens of FIG. 11e into a light guide.
Figure 14:
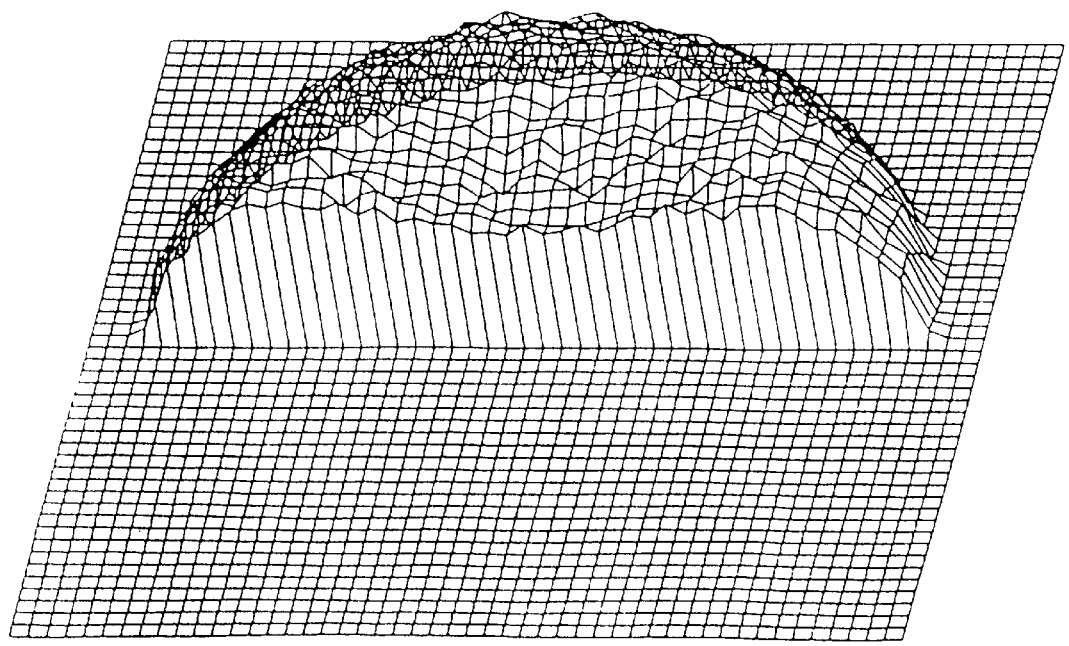
FIG. 14 is a three dimensional plot of light intensity focussed by the condenser lens of FIG. 12 into a light guide.

FIGS. 13 and 14 illustrate three dimensional plots of light intensity over a surface area of an input end of a light guide. The plot of light intensity versus area of FIG. 13 corresponds to the embodiment of FIGS. 7–9 which uses condenser lenses 117. The plot of FIG. 14, which illustrates a relatively consistent distribution of light over the surface area, corresponds to the embodiment of FIG. 12 using a condenser lens 117'.

The relatively consistent distribution of light over the surface area of the input end of the light guide can be generally attributed to the shape of the condenser lenses 117'. Each of the transfer lenses 107, 109, 111, 113, and 115 is preferably configured to transmit an approximately equal amount of light from the light source 103 onto a corresponding condenser lens 117'. The condenser lenses 117' differ in shape, as compared to the condenser lens 117 of FIG. 11e. More particularly, each of the presently preferred condenser lenses 117' has a double-curved surface that facilitates a relatively consistent distribution of light over the surface area of the input end of the light guide.

Although the transfer lenses 107, 109, 111, 113 and 115 preferably comprise pentagon shapes having five edges each, with the exception of the very top transfer lens of the top lens group 123, the transfer lenses of the present invention may comprise virtually any shape. The shapes of these transfer lenses may comprise trapezoids (including squares), triangles, pentagons, hexagons, combinations of shapes, or arbitrarily undefined shapes which happen to fit together on the surface of a sphere. Generally, none of theses shapes will be regular in that they will not have equal length sides, but the present invention is intended to cover embodiments using regularly shaped lenses, as well. All, some, or none of the lenses may be the same size, according to the present invention. The pentagon-shaped lenses of the present invention are fairly circular in shape, and thus facilitate focussing of light with minimum angular divergence. However, other noncircular as well as circular lenses may be used according to the present invention. Although the present invention incorporates a fairly well-rounded sphere, any assembly of lenses partially or completely surrounding a light source may be implemented.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

We claim:

1. An illumination system, comprising:
   an illumination source for emitting light;
   a configuration of focussing lenses disposed around the illumination source, each of the focussing lenses being adapted for focussing emitted light from the illumination source in a generally radially outwardly direction therefrom; and
   a plurality of mixing rods, each of the focussing lenses being adapted for focussing light into a corresponding one of the plurality of mixing rods.

2. The illumination system as recited in claim 1, the configuration of focussing lenses comprising a spherical structure of focussing lenses disposed around the illumination source.

3. The illumination system as recited in claim 1, the illumination source comprising a sulfur bulb.

4. The illumination system as recited in claim 1, each of the focussing lenses being adapted for focusing an approximately equal amount of emitted light from the illumination source in a generally radially outwardly direction from the illumination source.

5. The illumination system as recited in claim 4, a plurality of the focussing lenses comprising a pentagon shape having five edges.

6. An illumination system, comprising:
   an electrodeless lamp for emitting light; and
   a configuration of focussing lenses disposed around the electrodeless lamp, each of the focussing lenses being adapted for focussing emitted light from the electrodeless lamp in a generally radially outwardly direction therefrom.

7. The illumination system as recited in claim 6, further comprising a plurality of mixing rods, each of the focussing lenses being adapted for focussing light into a corresponding one of the plurality of mixing rods.

8. The illumination system as recited in claim 7, each of the focussing lenses comprising a transfer lens.

9. The light guide illumination system as recited in claim 8, further comprising a plurality of condenser lenses, each of the plurality of transfer lenses being adapted for focussing light into a corresponding condenser lens.

10. A spherical illumination system, comprising:
    an illumination source having a proximal portion, a distal portion, and an intermediate portion between the proximal portion and the distal portion;
    a curved reflector disposed near the proximal portion of the illumination source; and
    a semi-spherical array of focussing lenses disposed generally around the distal portion and the intermediate portion of the illumination source, each of the focussing lenses being adapted for focusing emitted light from the illumination source in a generally radially outwardly direction from the illumination source, the curved reflector and the semi-spherical array of focussing lenses together substantially surrounding the illumination source, the curved reflector being adapted for redirecting proximally-directed light into the semi-spherical array of focussing lenses.

11. The spherical illumination system as recited in claim 10, the illumination source comprising a sulfur bulb.

12. The spherical illumination system as recited in claim 11, the illumination source comprising a 1000 watt sulfur bulb.

13. The spherical illumination system as recited in claim 12, the curved reflector having a generally circular perimeter.

14. An assembly of lenses, comprising five radially curved side lens groups, and a radially curved top lens group, each of the plurality of radially curved lens groups having a plurality of focussing lenses formed therein, the plurality of lens groups being adapted for contacting and fitting next to one another substantially around an illumination source, to thereby substantially surround the illumination source.

15. The assembly of lenses as recited in claim 14, the plurality of lens groups being adapted for contacting and fitting next to one another around an illumination source, and further being adapted for maintaining at least one air gap between two of the lens groups.

16. The assembly of lenses as recited in claim 15, the at least one air gap being adapted for venting heat from the illumination source when the assembly of lenses has been assembled to substantially surround the illumination source.

17. The assembly of lenses as recited in claim 14, each of the five side lens groups comprising twelve focussing lenses, and the top lens group comprising eight focussing lenses.

18. The assembly of lenses as recited in claim 14, each of the twelve focussing lenses of each of the five side lens groups having five edges, each of seven of the eight focussing lenses of the top lens group having four edges, and an eighth of the eight focussing lenses of the top lens group having seven edges.

19. An illumination system, comprising:

an illumination source for emitting light; and a configuration of focussing lenses disposed around the illumination source, each of the focussing lenses being adapted for focussing emitted light from the illumination source in a generally radially outwardly direction therefrom, a plurality of the focussing lenses comprising a pentagon shape having five edges.

20. The illumination system as recited in claim 1, and further comprising a plurality of light guides corresponding to the number of focussing lenses, the light guides being arranged so that an input end of each of the light guides receives illumination from a corresponding output end of one of the mixing rods.

* * * * *